United States Patent
Wolcott et al.

(10) Patent No.: US 10,662,096 B2
(45) Date of Patent: May 26, 2020

(54) WASTEWATER TREATMENT SYSTEM WITH VERTICAL TUBES AND METHOD THEREOF

(71) Applicants: Scott Wolcott, Rochester, NY (US); Lee Newman, Camillus, NY (US); Peter Martin, Brooktondale, NY (US); Joshua Goldowitz, Rochester, NY (US)

(72) Inventors: Scott Wolcott, Rochester, NY (US); Lee Newman, Camillus, NY (US); Peter Martin, Brooktondale, NY (US); Joshua Goldowitz, Rochester, NY (US)

(*) Notice: Subject to any disclaimer, the term of this patent is extended or adjusted under 35 U.S.C. 154(b) by 0 days.

(21) Appl. No.: 16/374,062

(22) Filed: Apr. 3, 2019

(65) Prior Publication Data
US 2019/0300406 A1   Oct. 3, 2019

Related U.S. Application Data

(60) Provisional application No. 62/651,791, filed on Apr. 3, 2018.

(51) Int. Cl.
*C02F 3/10* (2006.01)
*C02F 3/32* (2006.01)
(Continued)

(52) U.S. Cl.
CPC ............ *C02F 3/104* (2013.01); *C02F 3/327* (2013.01); *C02F 2101/105* (2013.01);
(Continued)

(58) Field of Classification Search
CPC .... C02F 3/104; C02F 3/327; C02F 2101/105; C02F 2103/002; C02F 2209/40; C02F 2203/006; C02F 2101/16
(Continued)

(56) References Cited

U.S. PATENT DOCUMENTS 5,554,280 A * 9/1996 Loehr .................. A01K 63/045
                                                         210/167.26
5,618,428 A * 4/1997 Oslund ................ A01K 63/045
                                                         119/246
(Continued)

FOREIGN PATENT DOCUMENTS

WO     2010108226 A1    9/2010

OTHER PUBLICATIONS

Fasil Ejigu Eregno, Melesse Eshetu Moges, Arve Heistad Faculty of Science and Technology, Norwegian University of Life Sciences (NMBU), P.O. Box 5003, NO-1432 Ås, Norway; Treated Greywater Reuse for Hydroponic Lettuce Production in a Green Wall System: Quantitative Health Risk Assessment; Water 2017, 9(7), 454; doi:10.3390/w9070454.

*Primary Examiner* — Fred Prince

(57) ABSTRACT

A wastewater treatment system, including: an equalization tank arranged to receive wastewater; a flow tube including an interior space bounded by at least one side wall of the flow tube; a plurality of media particles disposed within the interior space; and a pump arranged to pump the wastewater from the equalization tank to the flow tube. The plurality of media particles has a mean diameter of at least 4 millimeters. The wastewater is arranged to drain to the equalization tank through the plurality of media particles and the interior space. The flow tube is arranged to reduce a concentration of an organic contaminant in the wastewater.

20 Claims, 6 Drawing Sheets

(51) Int. Cl.
*C02F 101/16* (2006.01)
*C02F 103/00* (2006.01)
*C02F 101/10* (2006.01)

(52) U.S. Cl.
CPC .... *C02F 2101/16* (2013.01); *C02F 2103/002* (2013.01); *C02F 2203/006* (2013.01); *C02F 2209/40* (2013.01)

(58) Field of Classification Search
USPC ........ 210/602, 615, 616, 617, 903, 906, 259
See application file for complete search history.

(56) References Cited

U.S. PATENT DOCUMENTS

| | | | |
|---|---|---|---|
| 7,627,983 | B1 | 12/2009 | Deutsch-Aboulmahassine |
| 7,788,848 | B1 | 9/2010 | Koumoudis |
| 8,002,984 | B1 | 8/2011 | Wanielista et al. |
| 8,282,818 | B1 * | 10/2012 | Dobie .................. C02F 3/06 210/151 |
| 8,627,597 | B2 | 1/2014 | Solano Cabello |
| 8,756,862 | B1 | 6/2014 | Huberman et al. |
| 9,015,991 | B2 | 4/2015 | Heather |
| 9,131,646 | B2 | 9/2015 | Sung |
| D761,598 | S | 7/2016 | Goodman |
| 9,440,411 | B2 | 9/2016 | Hellwig |
| 2003/0024874 | A1 * | 2/2003 | Wallace .................. C02F 3/00 210/602 |
| 2005/0230310 | A1 * | 10/2005 | Butts .................. C02F 3/04 210/615 |
| 2007/0017867 | A1 * | 1/2007 | Pedros .................. C02F 3/06 210/615 |

* cited by examiner

N.T.S.

GREEN WALL TREATMENT SYSTEM
N.T.S.

PROFILE SECTION OF GREEN WALL
N.T.S.

| Poraver (4 - 8 mm) | | | | | |
|---|---|---|---|---|---|
| time, sec | Q, gpm | Vel, m/s | Vi, m/s | Re | HLR, gpm/sf |
| 12.2 | 0.5 | 0.050 | 0.125 | 324.0 | 5.1 |
| 8.5 | 1.0 | 0.072 | 0.179 | 464.4 | 10.2 |
| 8.2 | 2.7 | 0.074 | 0.186 | 482.0 | 27.7 |

Fig. 7

| Growstone (4 - 8 mm) | | | | | |
|---|---|---|---|---|---|
| time, sec | Q, gpm | Vel, m/s | Vi, m/s | Re | HLR, gpm/sf |
| 15.6 | 0.5 | 0.039 | 0.071 | 252.7 | 5.1 |
| 12.3 | 1.0 | 0.049 | 0.090 | 320.3 | 10.2 |
| 8.8 | 2.7 | 0.069 | 0.126 | 447.6 | 27.7 |

Fig. 8

| Hydroton (8 - 16 mm) | | | | | |
|---|---|---|---|---|---|
| time, sec | Q, gpm | Vel, m/s | Vi, m/s | Re | HLR, gpm/sf |
| 9.0 | 0.5 | 0.068 | 0.134 | 854.7 | 5.1 |
| 7.6 | 1.0 | 0.080 | 0.158 | 1009.2 | 10.2 |
| 4.1 | 2.7 | 0.148 | 0.289 | 1852.3 | 27.7 |

Fig. 9

| Growstone (6 -18 mm) | | | | | |
|---|---|---|---|---|---|
| time, sec | Q, gpm | Vel, m/s | Vi, m/s | Re | HLR, gpm/sf |
| 5.6 | 0.5 | 0.110 | 0.200 | 1401.3 | 5.1 |
| 4.6 | 1.0 | 0.134 | 0.244 | 1709.3 | 10.2 |
| 4.1 | 2.7 | 0.150 | 0.273 | 1915.6 | 27.7 |

WASTEWATER TREATMENT SYSTEM WITH VERTICAL TUBES AND METHOD THEREOF

TECHNICAL FIELD

The present disclosure relates to a wastewater treatment system with vertical tubes containing relatively large media particles and a pump for pumping wastewater from an equalization tank to the vertical tubes. The wastewater drains through the tubes to the equalization tank and is cycled by the pump back to the flow tubes. The present disclosure also relates to a method of using the preceding system.

BACKGROUND

Known vertically oriented gray water treatment systems are limited to a single pass of the gray water, that is, the gray water passes through the system once and is discharged or reused. The gray water does not pass through to be recycled through the system. Known vertically oriented gray water treatment systems are not suitable for wastewater with contaminant levels higher than those typically associated with gray water.

SUMMARY

According to aspects illustrated herein, there is provided a wastewater treatment system, including: an equalization tank arranged to receive wastewater; a flow tube including an interior space bounded by at least one side wall of the flow tube; a plurality of media particles disposed within the interior space; and a pump arranged to pump the wastewater from the equalization tank to the flow tube. The plurality of media particles has a mean diameter of at least 4 millimeters. The wastewater is arranged to drain to the equalization tank through the plurality of media particles and the interior space. The flow tube is arranged to reduce a concentration of an organic contaminant in the wastewater.

According to aspects illustrated herein, there is provided a method of treating wastewater, including: flowing the wastewater from a wastewater source into an equalization tank; pumping the wastewater from the equalization tank to at least one flow tube; draining the wastewater into the equalization tank through a respective interior space of each flow tube and a respective plurality of media particles disposed within the interior space of said each flow tube; and reducing a concentration of an organic contaminant in the wastewater. The respective plurality of media particles has a mean diameter of at least 4 millimeters.

According to aspects illustrated herein, there is provided a wastewater treatment system, including: an equalization tank arranged to receive wastewater; a flow tube including an interior space bounded by at least one side wall of the flow tube; a plurality of media particles disposed within the interior space; and a pump arranged to pump the wastewater from the equalization tank to the flow tube. The plurality of media particles has a mean diameter of at least 4 millimeters. The wastewater is arranged to drain to the equalization tank through the plurality of media particles and the interior space. The system is arranged to maintain a hydraulic loading rate of at least 5 gallons per minute/square foot into the flow tube. The interior space and the plurality of media particles are arranged to host microorganisms to reduce a concentration of an organic contaminant in the wastewater.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 7 is a table of test results for the system shown in FIG. 1;

FIG. 8 is a table of test results for the system shown in FIG. 1;

FIG. 9 is a table of test results for the system shown in FIG. 1; and

FIG. 10 is a table of test results for the system shown in FIG. 1.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
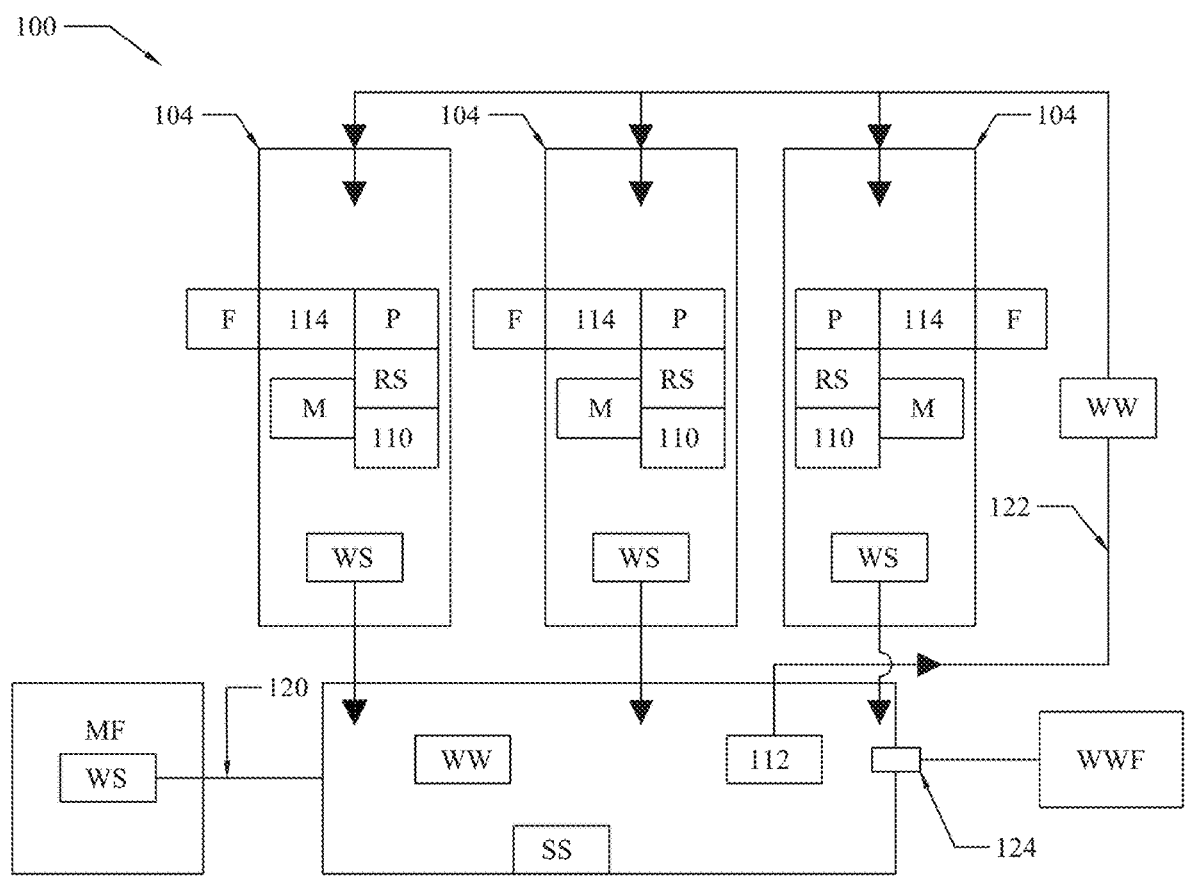
FIG. 1 is a block diagram of a wastewater treatment system with vertical tubes.

FIG. 1 is a block diagram of wastewater treatment system with vertical tubes 100.

Figure 2:
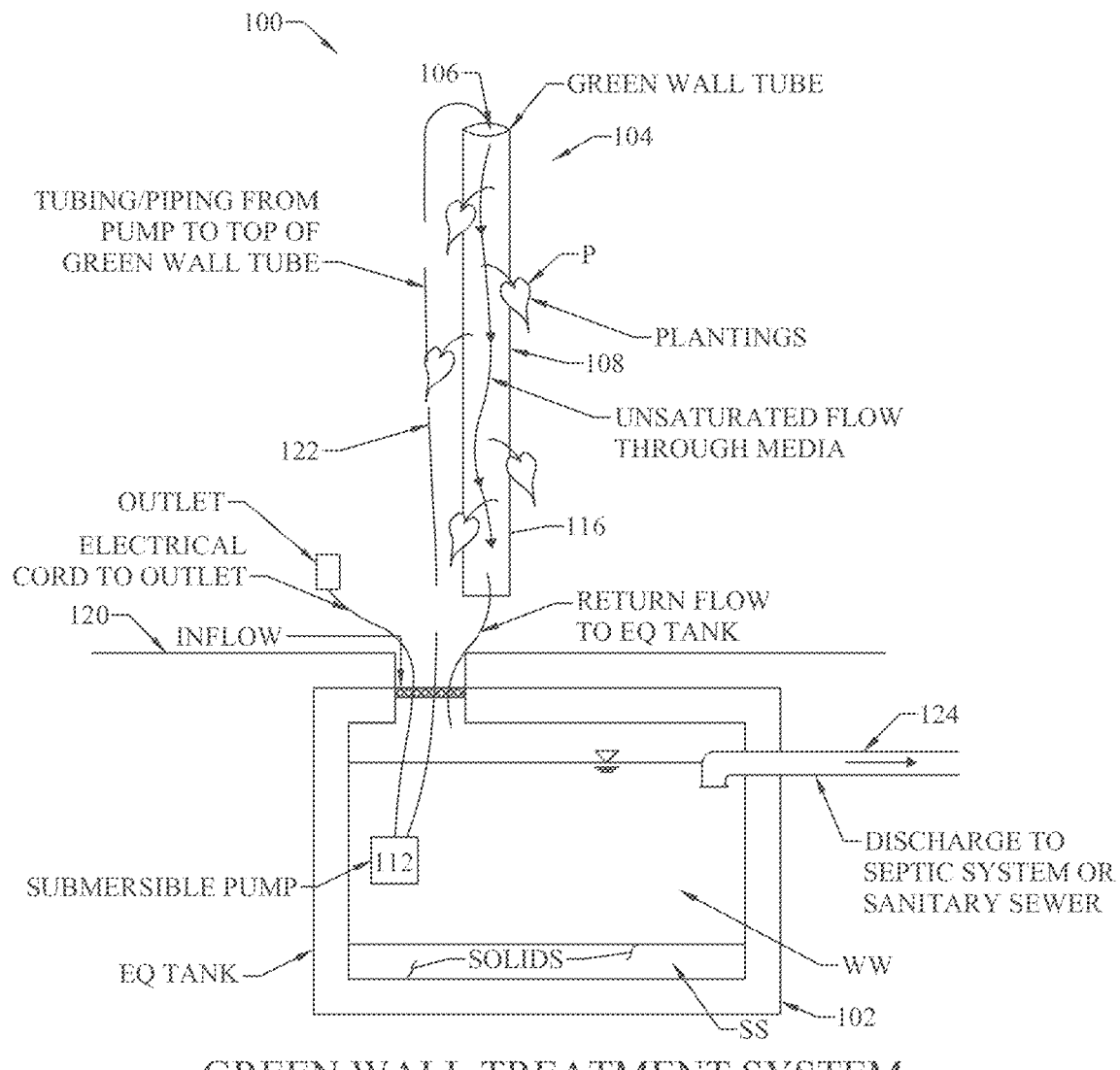
FIG. 2 is a schematic representation of the wastewater treatment system with vertical tubes shown in FIG. 1.

FIG. 2 is a schematic representation of wastewater treatment system with vertical tubes 100 shown in FIG. 1.

Figure 3:
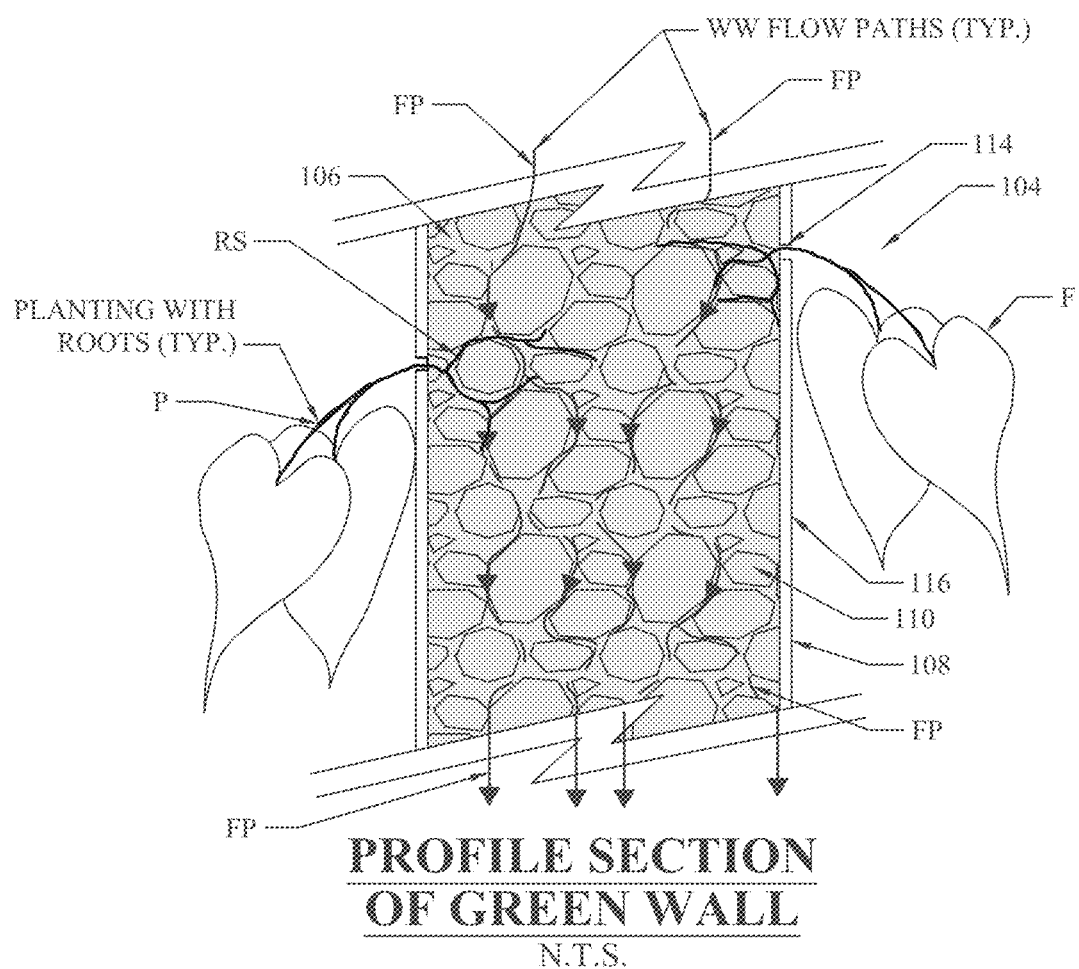
FIG. 3 is a partial cross-sectional view of a flow tube shown in FIG. 2.

FIG. 3 is a partial cross-sectional view of a flow tube shown in FIG. 2. The following should be viewed in light of FIGS. 1 and 2. System 100 includes: equalization tank 102 arranged to receive wastewater WW from wastewater source WS; flow tube, or pipe, 104 including interior space 106 bounded by at least one side wall 108 of flow tube 104; media particles 110 disposed within interior space 106; and pump 112 arranged to pump wastewater WW from equalization tank 102 to flow tube 104. Pump 112 can be any suitable pump known in the art, including but not limited to an electric pump or a pneumatic pump. Although one pump 112 is shown in FIG. 1, it is understood that other numbers of pumps 100 are possible for system 100.

In an example embodiment, flow tube 104 is cylindrical in shape. Flow tube 104 is not limited to a particular number or configuration of sides or side walls, and is not limited to a particular ratio or set of component dimensions. For example, flow tube 104 can have: planar side walls and a square, rectangular, or polygonal shape; curved sidewalls; or a combination of planar and curved side walls. System 100 is not limited to a single flow tube 104 or any particular number of flow tubes 104. In the example of FIG. 1, three flow tubes 104 are shown. For a system 100 with multiple flow tubes 104, the flow tubes 104 can have the same structure and configuration, or individual flow tubes 104 can have different structures and/or configurations. Media particles 110 can be any suitable media particles known in the art, including but not limited to "Poraver," "Growstone," and "Hydroton," which are trade names for media particulate.

Wastewater WW pumped to flow tube 104 is arranged to drain to equalization tank 102 through media particles 110 and interior space 106. As further described below, flow tube 104 is arranged to reduce a concentration of organic contaminant OC in wastewater WW. In FIG. 3, representative flow paths FP of wastewater WW through flow tube 104 are shown. As further described below, system 100 is able to simultaneously reduce respective concentrations of multiple organic contaminants OC.

Media particles 100 have a mean diameter of at least 4 millimeters. In an example embodiment, media particles 110 include an entirety of media particles disposed within interior space 106.

In an example embodiment, media particles 110 have a mean diameter of at least 8 millimeters. In an example embodiment, media particles 110 have a mean diameter of at least 10 millimeters. In an example embodiment, media particles 110 have a mean diameter of at least 12 millimeters.

Interior space 106 and media particles 110 are arranged to host a population of microorganisms M. For example, a biofilm of microorganisms M is arranged to form on particle 110. Microorganisms M are arranged to metabolize one or more organic contaminants OC in wastewater WW to reduce the concentration of organic contaminants OC in wastewater WW.

Flow tube 104 is arranged to support plants P. Interior space 106 is arranged to receive respective root systems RS of plants P. Respective root systems RS are arranged to intermingle with media particles 110 and, as further described below, are arranged to reduce the concentration of one or more organic contaminants OC in wastewater WW. Plants P are arranged to pass through through-bores 114 in side wall 108 and foliage F, of plants P is arranged to be disposed on exterior 116 of flow tube 104. Plants P aid in the reduction of contaminant levels. For example, systems RS provide an environment for microorganism M populations, and the metabolic activity of microorganisms M transforms organic nitrogen in wastewater WW to inorganic nitrogen, which plants P uptake.

In an example embodiment, system 100 is arranged to treat wastewater WW in which organic contaminant OC includes, but is not limited to, one, some, or all of: biochemical oxygen demand (BOD); total suspended solids (TSS); turbidity; nitrogen; or phosphorous.

In an example embodiment, system 100 is arranged to treat wastewater WW in which organic contaminant OC is one, some, or all of: BOD with a concentration of greater than 600 milligrams/liter (mg/l); TSS with a concentration greater than 200 mg/l; turbidity with a concentration greater than 100 Nephelometric Turbidity Units (NTUs); nitrogen with a concentration greater than 30 mg/l; and phosphorous with a concentration greater than 30 mg/l.

System 100 is arranged to treat wastewater WW in which organic contaminant OC is one, some, or all of: BOD with a concentration of greater than 100 mg/l; TSS with a concentration greater than 20 mg/l; turbidity with a concentration greater than 40 NTUs; nitrogen with a concentration greater than 2 mg/l; or phosphorous with a concentration greater than 0.4 mg/l.

System 100 is arranged to treat wastewater WW with characteristics typical of gray water, for example, wastewater WW in which organic contaminant OC is one, some, or all of: BOD with a concentration of less than or equal to 100 mg/l; TSS with a concentration less than or equal to 20 mg/l; turbidity with a concentration less than or equal to 40 NTUs; nitrogen with a concentration less than or equal to 2 mg/l; and phosphorous with a concentration less than or equal to 0.4 mg/l.

Figure 4:
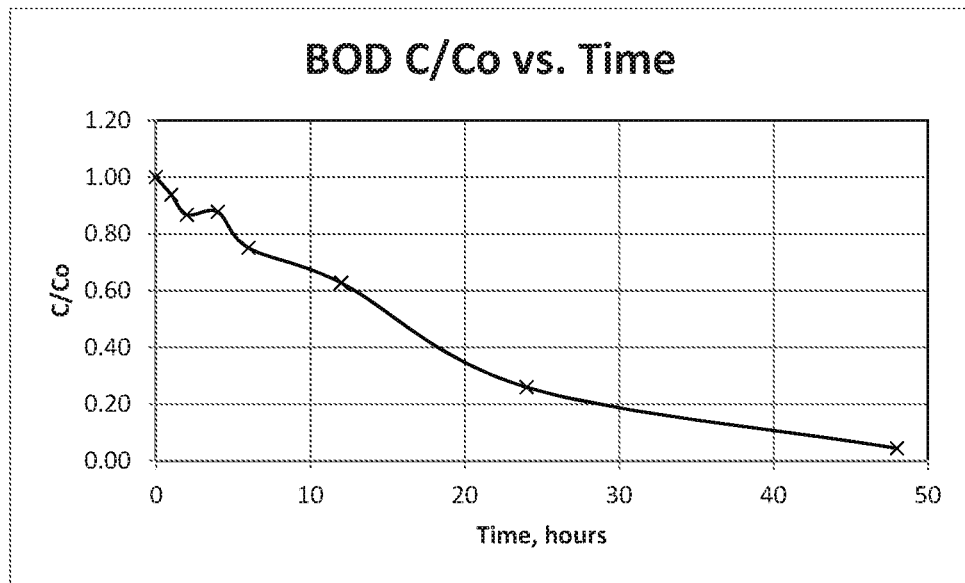
FIG. 4 is a graph of concentration versus time for biological oxygen demand in wastewater treated by the wastewater treatment system with vertical tubes shown in FIG. 1.

FIG. 4 is a graph of concentration versus time for biological oxygen demand in wastewater WW treated by the wastewater treatment system with vertical tubes 100 shown in FIG. 1.

Figure 5:
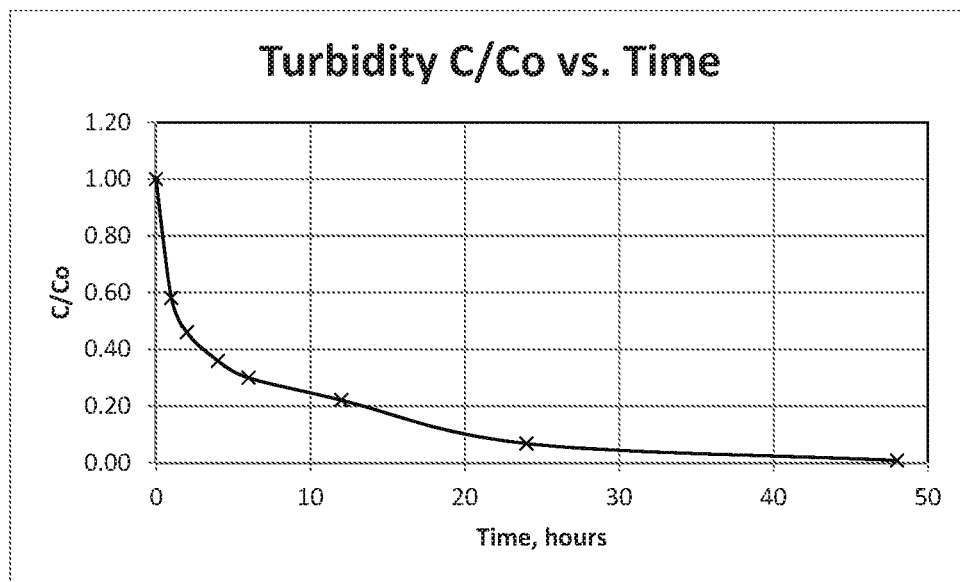
FIG. 5 is a graph of concentration versus time for turbidity in wastewater treated by the wastewater treatment system with vertical tubes shown in FIG. 1.

FIG. 5 is a graph of concentration versus time for turbidity in wastewater WW treated by the wastewater treatment system with vertical tubes 100 shown in FIG. 1.

Figure 6:
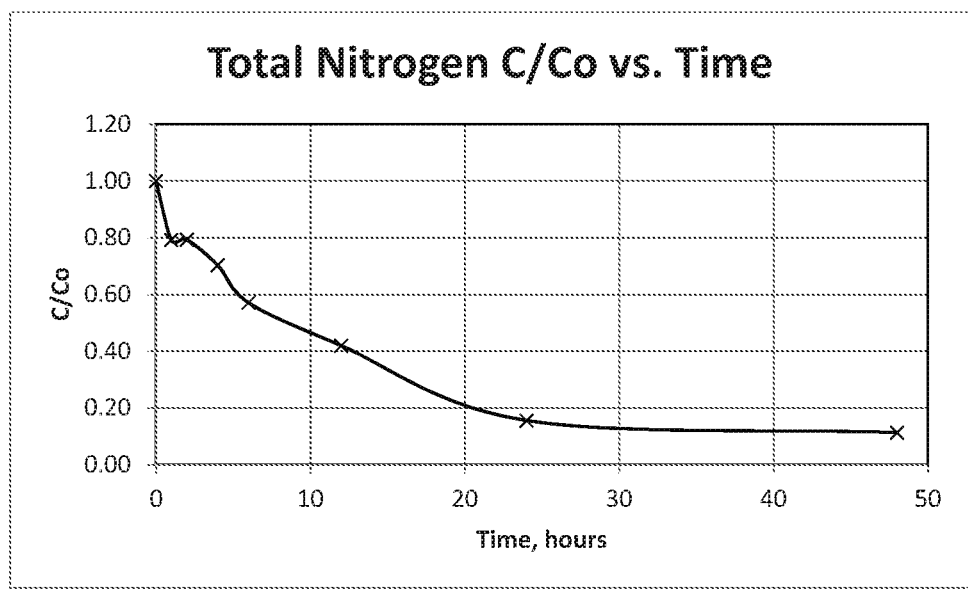
FIG. 6 is a graph of concentration versus time for nitrogen in wastewater treated by the wastewater treatment system with vertical tubes shown in FIG. 1.

FIG. 6 is a graph of concentration versus time for nitrogen in wastewater WW treated by the wastewater treatment system with vertical tubes 100 shown in FIG. 1. The following should be viewed in light of FIGS. 1 through 6. In FIGS. 4 through 6: the Y axis is a ratio ($C/C_o$), where $C_o$ is an initial concentration of the organic contaminant in wastewater WW, and C is the concentration of the organic contaminant at a later time after treatment of wastewater WW by system 100; and the X axis is time duration of treatment. FIGS. 4 through 6 are based on testing of system 100 with media particles 110 having a mean diameter of 12 millimeters, and prove the effectiveness of system 100 in reducing organic contaminant concentrations in wastewater WW. For example, for each of FIGS. 4 through 6, the ratio of $C/C_o$ was reduced from an initial value of 1.00 to less than 0.20. In FIG. 4, the $C_o$ is 4,500 mg/l for BOD. In FIG. 5, the $C_o$ is 1,000 mg/l for turbidity. In FIG. 6, the $C_o$ is 194 mg/l for nitrogen.

System 100 is arranged to use pump 112 to recycle/pump wastewater WW from tank 102 to flow tube 104. That is, wastewater WW which had previously been pumped to flow tube 104 and drained to tank 102 is recycled by pump 112 to flow tube 104. Thus, system 100 is a multi-pass system, or pass-through system, not a single pass system in which wastewater WW pumped to flow tube 104 would not drain back to tank 102. To facilitate timely reduction of concentrations of contaminant OC and operation as a multi-pass system, system 100 is configured to operate with sufficiently high hydraulic loading rates (HLRs). The volume or flowrate into a treatment system is typically expressed as the HLR. The HLR is defined as the flowrate per unit surface area that the wastewater is applied upon. In the case of system 100, the unit surface area is the area of a horizontal slice of interior space 106.

FIGS. 7 through 10 are respective tables of test results for system 100 shown in FIG. 1. FIGS. 7 through 10 present results from testing system 100 with various combinations of media particle 110 types and mean diameters of media particles 110. As seen in FIGS. 7 through 10, each of the combinations shown in FIGS. 7 through 10 supported respective HLRs from 5.0 gallons per minute per square foot (gpm/sf) to over 27.0 gpm/sf.

Additional components (not shown) can be added to system 100. In an example embodiment (not shown), valves or other flow control devices are included in input line 120 from waste source WS to tank 102, and/or in line 122 from pump 112 to the flow tubes 104 in FIG. 1.

The following should be viewed in light of FIGS. 1 through 10. The following describes a method of treating wastewater. Although the method is presented as a sequence of steps for clarity, no order should be inferred from the sequence unless explicitly stated. A first step flows wastewater WW from wastewater source WS into equalization tank EQ. A second step pumps, using pump 112, wastewater WW from equalization tank 102 to at least one flow tube 104. For each flow tube, a third step drains wastewater WW into equalization tank 102 through interior space 106 of each flow tube 104 and respective media particles 110 disposed within interior space 106 of each flow tube 104. A fourth step reduces a concentration of organic contaminant OC in wastewater WW. Media particles 110 have a mean diameter of at least 4 millimeters. In an example embodiment, media particles 110 include an entirety of media particles disposed within interior space 106 of each tube 104.

In an example embodiment, media particles 110 have a mean diameter of at least 8 millimeters. In an example embodiment, media particles 110 have a mean diameter of at least 10 millimeters. In an example embodiment, media particles 110 have a mean diameter of at least 12 millimeters.

A fifth step forms a biofilm of microorganisms M on media particles 110. Then, reducing the concentration of organic contaminant OC in wastewater WW includes metabolizing, with the biofilm of microorganisms M, organic contaminant OC.

A sixth step repeats, at least one time, a cycle of: pumping wastewater WW from equalization tank 102 to the at least one flow tube 104; draining wastewater WW into equalization tank 102 through interior space 106 of each flow tube 104 and respective media particles 110; and reducing the concentration of organic contaminant OC in wastewater WW. It is understood that the above cycle can be repeated any number of times as desired or required.

In an example embodiment, reducing the concentration of organic contaminant OC in wastewater WW includes reducing, from 1.00 to 0.20, a ratio of an initial concentration of organic contaminant OC in wastewater WW (for example when wastewater WW is flowed into equalization tank 102 from wastewater source WS) to a concentration of organic contaminant OC in wastewater WW at a later point in time after treatment by system 100. For example, the ratio is of an initial concentration of organic contaminant OC in wastewater WW prior to treatment of wastewater WW by system 100, and a concentration of organic contaminant OC in wastewater WW after treatment by system 100.

In an example embodiment, reducing, from 1.00 to 0.20, the ratio of the initial concentration of organic contaminant OC in wastewater WW to the concentration of organic contaminant OC in wastewater WW at the later point in time after treatment by system 100 includes: reducing the ratio for an initial biochemical oxygen demand concentration greater than 600 milligrams/liter; or reducing the ratio for an initial total suspended solids concentration greater than 200 milligrams/liter; or reducing the ratio for an initial turbidity concentration greater than 100 NTUs; or reducing the ratio for an initial nitrogen concentration greater than 30 milligrams/liter; or reducing the ratio for an initial phosphorous concentration greater than 30 milligrams/liter.

In an example embodiment, reducing, from 1.00 to 0.20, the ratio of the initial concentration of organic contaminant OC in wastewater WW to the concentration of organic contaminant OC in wastewater WW at the later point in time after treatment by system 100 includes: reducing the ratio for an initial biochemical oxygen demand concentration greater than 100 milligrams/liter; or reducing the ratio for an initial total suspended solids concentration greater than 20 milligrams/liter; or reducing the ratio for an initial turbidity concentration greater than 40 NTUs; or reducing the ratio for an initial nitrogen concentration greater than 2 milligrams/liter; or reducing the ratio for an initial phosphorous concentration greater than 0.4 milligrams/liter.

In an example embodiment, reducing, from 1.00 to 0.20, the ratio of the initial concentration of organic contaminant OC in wastewater WW to the concentration of organic contaminant OC in wastewater WW at the later point in time after treatment by system 100 includes: reducing the ratio for an initial biochemical oxygen demand concentration less than or equal to 100 milligrams/liter; or reducing the ratio for an initial total suspended solids concentration less than or equal to 20 milligrams/liter; or reducing the ratio for an initial turbidity concentration less than or equal to 40 NTUs; or reducing the ratio for an initial nitrogen concentration less than or equal to 2 milligrams/liter; or reducing the ratio for an initial phosphorous concentration less than or equal to 0.4 milligrams/liter. The preceding initial concentrations are approximately typical of gray water.

In an example embodiment, a further step intermingles: for each flow tube 104, root system RS of respective plants P with media particles 110; passes respective plants P through through-bores 114 in side wall 108; locates foliage F of plants P outside of flow tube 104; and with root system RS, reduces the concentration of organic contaminant OC in wastewater WW. For example, systems RS provide an environment for microorganism M populations, and the metabolic activity of microorganisms M transforms organic nitrogen in wastewater WW to inorganic nitrogen, which plants P uptake.

In an example embodiment, system 100 maintains a hydraulic loading rate of at least: 5 gallons per minute/square foot into the flow tube; or at least 10 gallons per minute/square foot into the flow tube; or at least 20 gallons per minute/square foot into the flow tube; or at least 27 gallons per minute/square foot into flow tube or flow tubes 104.

In an example embodiment, flowing wastewater WW from wastewater source WS into equalization tank 102 includes flowing wastewater WW from food or beverage manufacturing facility MF.

System 100 and a method using system 100 can be used in a pulse input, or a continuous flow mode. Regarding the pulsed input, for manufacturing facility MF, source WS supplies wastewater WW in discrete pulses or batches, for example associated with cleaning of equipment used as part of operations for manufacturing facility MF. However, system 100 can be operated on a flexible schedule as needed to meet system requirements. For example, system 100 can be operated full-time at 24 hours a day, seven days per week or for some portion of full-time. System 100 can be operated and shut down on a schedule. For example, system 100 can be operated during business hours for manufacturing facility MF and system 100 can be de-activated during non-business hours for manufacturing facility MF by de-activating pump or pumps 112. Typically, such intermittent operation does not harm plants P and microorganisms M; however, if de-activating system 100 during non-business hours present a dehydration problem for plants P or microorganisms M, pump 100 can be activate for one or more short time periods to hydrate plants P and microorganisms M.

In an example embodiment, wastewater WW entering equalization tank 102 displaces an equal volume of wastewater WW out of equalization tank 102 through outlet 124 of equalization tank 102. System 100 can be used as a pretreatment system, in which case outlet 124 is connected to wastewater treatment facility WWF for further or final treatment. For example, facility WWF can be an on-site facility for facility MF or facility WWF can be a municipal facility.

In an example embodiment, equalization tank 102 is located below ground level to enable wastewater WW to flow from wastewater source WS to equalization tank 102 by gravity. A volume of equalization tank 102 can be implement such that equalization tank 102 buffers peak flows of wastewater WW from wastewater source WS and peak contaminant concentrations in wastewater WW from wastewater source WS.

Equalization tank 102 collects settleable solids SS to prevent clogging of flow tubes 104 by the solids SS. Solids SS can be removed as needed. In an example embodiment, pump 112 is a submersible pump located in equalization tank 102.

In an example embodiment, media particles 110 are porous, light weight, granular in structure, and as noted above, uniform in size (mean diameter). Media particles 110 are large enough to facilitate gravity flow through tubes 104, for example as illustrated by the HLRs discussed above. Media particles 110 provide structure for root systems RS and microorganisms M, for example a microbiological biofilm. Thus, tubes 104 host microorganisms M.

Possible manufacturing facilities MF for system 100 include, but are not limited to: craft brewers, wineries, distilleries, cider makers, fish farms, and fresh water aquariums. Since flow tubes 104 are vertically arranged, for example, attached to walls, tubes 104 have a small footprint, reducing floor space needed for system 100. System 100 can be installed indoors and in a suitable climate, outdoors.

System 100 is able to successfully treat wastewater having much higher organic contaminant levels than can be treated by known gray water treatment systems. For example, upper contaminant levels for known gray water treatment system are approximately: BOD with a concentration of less than or equal to 100 mg/l; turbidity with a concentration less than or equal to 40 NTUs; and nitrogen with a concentration less than or equal to 2 mg/l. In contrast, as shown in FIGS. 4 through 6, respectively, system 100 is able to successfully treat wastewater having contaminant concentrations of: 4,500 mg/l for BOD; 1,000 NTU for turbidity; and 194 mg/l for nitrogen.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

C concentration, organic contaminant
$C_o$ original concentration, organic contaminant
F foliage
FP flow path
M microorganism
MF food or beverage manufacturing facility
P plant
OC organic contaminant
RS root system
SS settleable solid
WS wastewater source
WW wastewater
WWF wastewater treatment facility
100 wastewater treatment system
102 equalization tank
104 flow tube
106 interior space
108 side wall
110 media particle
112 pump
114 through-bore
116 exterior, flow tube
120 input line
122 pump line
124 outlet

The invention claimed is:

1. A wastewater treatment system, comprising:
an equalization tank arranged to receive wastewater;
a flow tube including an interior space bounded by at least one side wall of the flow tube;
a plurality of media particles disposed within the interior space; and,
a pump arranged to pump the wastewater from the equalization tank to the flow tube, wherein the plurality of media particles has a mean diameter of at least 4 millimeters; wherein the wastewater is arranged to drain to the equalization tank through the plurality of media particles; and wherein the flow tube is arranged to reduce a concentration of an organic contaminant in the wastewater.

2. The wastewater treatment system of claim 1, wherein the flow tube is cylindrical in shape, or the plurality of media particles includes an entirety of media particles disposed within the interior space.

3. The wastewater treatment system of claim 1, wherein the plurality of media particles has a mean diameter of at least 8 millimeters; or wherein the plurality of media particles has a mean diameter of at least 10 millimeters; or wherein the plurality of media particles has a mean diameter of at least 12 millimeters.

4. The wastewater treatment system of claim 1, wherein the plurality of media particles is arranged to host a population of microorganisms; and wherein the population of microorganisms is arranged to metabolize the organic contaminant in the wastewater to reduce the concentration of the organic contaminant in the wastewater.

5. The wastewater treatment system of claim 1, wherein the interior space is arranged to receive respective root systems of a plurality of plants; wherein the respective root systems are arranged to intermingle with the plurality of media particles and are arranged to reduce the concentration of the organic contaminant in the wastewater; wherein the plurality of plants pass through a plurality of through-bores in the at least one side wall; and wherein foliage of the plurality of plants is arranged to be disposed on an exterior of the flow tube.

6. The wastewater treatment system of claim 1, wherein the organic contaminant is biochemical oxygen demand, total suspended solids, turbidity, nitrogen, or phosphorous.

7. The wastewater treatment system of claim 1, wherein the organic contaminant is biochemical oxygen demand with a concentration of greater than 600 milligrams/liter; or wherein the organic contaminant is total suspended solids with a concentration greater than 200 milligrams/liter; or wherein the organic contaminant is turbidity with a concentration greater than 100 Nephelometric Turbidity Units; or wherein the organic contaminant is nitrogen with a concentration greater than 30 milligrams/liter; or wherein the organic contaminant is phosphorous with a concentration greater than 30 milligrams/liter.

8. The wastewater treatment system of claim 1, wherein the pump is arranged to pump wastewater, previously drained through the flow tube to the equalization tank, to the flow tube.

9. A method of treating wastewater, comprising:
flowing the wastewater from a wastewater source into an equalization tank;
pumping the wastewater from the equalization tank to at least one flow tube;
draining the wastewater into the equalization tank through a respective interior space of each flow tube and a respective plurality of media particles disposed within the respective interior space of said each flow tube; and,
reducing a concentration of an organic contaminant in the wastewater, wherein the respective plurality of media particles has a mean diameter of at least 4 millimeters.

10. The method of claim 9, further comprising:
forming a biofilm of microorganisms on the respective plurality of media particles, wherein reducing the concentration of the organic contaminant in the wastewater includes metabolizing, with the biofilm of microorganisms, the organic contaminant.

11. The method of claim 9, wherein the respective plurality of media particles has a mean diameter of at least 8 millimeters; or wherein the respective plurality of media particles has a mean diameter of at least 10 millimeters; or wherein the respective plurality of media particles has a mean diameter of at least 12 millimeters.

12. The method of claim 9, wherein the respective plurality of media particles includes an entirety of media particles disposed within the respective interior space.

13. The method of claim 9, further comprising:
repeating, at least one time, a cycle of pumping the wastewater from the equalization tank to the at least one flow tube, draining the wastewater into the equalization tank through the respective interior space of said each flow tube and the respective plurality of media particles, and reducing the concentration of the organic contaminant in the wastewater.

14. The method of claim 13, wherein reducing the concentration of the organic contaminant in the wastewater includes reducing, from 1.00 to 0.20, a ratio of an initial concentration of the organic contaminant in the wastewater to a concentration of the organic contaminant in wastewater at a later point in time.

15. The method of claim 13, wherein the organic contaminant is biochemical oxygen demand with a concentration greater than 600 milligrams/liter; or wherein the organic contaminant is total suspended solids with a concentration greater than 200 milligrams/liter; or wherein the organic contaminant is turbidity with a concentration greater than 100 Nephelometric Turbidity Units; or wherein the organic contaminant is nitrogen with a concentration greater than 30 milligrams/liter; or wherein the organic contaminant is phosphorous with a concentration greater than 30 milligrams/liter.

16. The method of claim 13, wherein the organic contaminant is biochemical oxygen demand with a concentration greater than 100 milligrams/liter; or wherein the organic contaminant is total suspended solids with a concentration greater than 20 milligrams/liter; or wherein the organic contaminant is turbidity with a concentration greater than 40 Nephelometric Turbidity Units; or wherein the organic contaminant is nitrogen with a concentration greater than 2 milligrams/liter; or wherein the organic contaminant is phosphorous with a concentration greater than 0.4 milligrams/liter.

17. The method of claim 9, further comprising:
for said each flow tube, intermingling a root system of a respective plurality of plants with the respective plurality of media particles, passing the respective plurality of plants through a plurality of through-bores in a side wall of said each flow tube, locating foliage of the plurality of plants outside of said each flow tube, and with the root system, reducing the concentration of the organic contaminant in the wastewater.

18. The method of claim 9, further comprising:
maintaining a hydraulic loading rate of at least 5 gallons per minute/square foot into the flow tube; or,
maintaining a hydraulic loading rate of at least 10 gallons per minute/square foot into the flow tube; or,
maintaining a hydraulic loading rate of at least 20 gallons per minute/square foot into the flow tube; or,
maintaining a hydraulic loading rate of at least 27 gallons per minute/square foot into the flow tube.

19. A wastewater treatment system, comprising:
an equalization tank arranged to receive wastewater;
a flow tube including an interior space bounded by at least one side wall of the flow tube;
a plurality of media particles disposed within the interior space; and,
a pump arranged to pump the wastewater from the equalization tank to the flow tube, wherein the plurality of media particles has a mean diameter of at least 4 millimeters; wherein the wastewater is arranged to drain to the equalization tank through the plurality of media particles; wherein the system is arranged to maintain a hydraulic loading rate of at least 5 gallons per minute/square foot into the flow tube; and wherein the interior space and the plurality of media particles are arranged to host microorganisms to reduce a concentration of an organic contaminant in the wastewater.

20. The wastewater treatment system of claim 19, wherein the interior space is arranged to receive respective root systems of a plurality of plants; wherein the respective root systems are arranged to intermingle with the plurality of media particles and are arranged to reduce the concentration of the organic contaminant in the wastewater; wherein the plurality of plants is arranged to pass through a plurality of through-bores in the at least one side wall; and wherein foliage of the plurality of plants is arranged to be disposed on an exterior of the flow tube.

* * * * *